: 3,069,383
Patented Dec. 18, 1962

3,069,383
STABILIZATION OF RUBBER WITH o-PHENYLENEDIAMINES

Dean C. Hoel and George W. Steahly, St. Albans, W. Va., assignors to Monsanto Chemical Company, St. Louis, Mo., a corporation of Delaware
No Drawing. Filed June 8, 1955, Ser. No. 514,127
7 Claims. (Cl. 260—45.9)

The present invention relates to a new class of amino compounds which are especially valuable for the protection of sulfur vulcanizable rubbers. An object of the invention is to provide a new class of low volatile amines. A further object is to provide a class of amines from cheap available raw materials which have only low toxicity but high capacity to protect sulfur vulcanizable rubbers. Another object of the invention is to prevent exposure cracking of sulfur vulcanizable rubbers. A further object is to provide a class of amine anti-exposure cracking agents which do not activate cure to the extent that stocks containing them are no longer processable. A specific object of the invention is to provide a class of amines for addition to butadiene-styrene copolymers which prevent heat embrittlement of the copolymer both in the raw and vulcanized states. A further specific object of the invention is to provide a class of amines which inhibit the increase of modulus and lowering of elongation on aging vulcanized butadiene-styrene copolymer rubber. Other and further objects will in part be apparent and in part specifically pointed out in the detailed description following.

One of the major problems of the rubber industry is the protection of vulcanizates of sulfur-vulcanizable rubbers against exposure cracking, that is degradation of the vulcanizates due to ozone while under static or dynamic stress. The problem is a serious one, particularly with respect to the service life of rubber tires, and is aggravated by the fact that in general chemical antioxidants have little or no value in protecting vulcanizates against deterioration by ozone. Waxes which form a protective surface film are useful to inhibit exposure cracking if the rubber is not flexed but protection is lost once the film breaks. When a rubber surface, whether natural or synthetic, comes into contact with an atmosphere containing even a few parts ozone per million a myriad of cracks form on the surface. The cracks continue to grow so that the useful life of the article rapidly terminates. The severity of the problem when rubber articles must be stored for long periods of time will be readily appreciated.

The manufacture and use of butadiene-styrene copolymer rubber presents specific problems somewhat different than encountered in natural rubber technology. An antioxidant is added to the latex after the emulsion copolymerization of butadiene-styrene copolymer rubber in order to prevent continued polymerization as well as to inhibit oxidation. In contrast to the aging of natural rubber vulcanizates which is manifested by loss of tensile strength, vulcanizable butadiene-styrene copolymer rubber maintains essentially the original tensiles after aging but undergoes serious loss of rubbery properties. The modulus increases and the extent to which the stock can be elongated without rupture is much less than it was before aging. The preservation of the rubbery properties in the vulcanizates is much more diffcult than inhibiting heat polymerization of the raw polymer. In spite of the antioxidant incorporated into the copolymer at the site of manufacture, hardening of the vulcanizates continues to take place upon aging.

The effect of any chemical agent depends upon its remaining in the rubber. High volatility would therefore be a serious limiting factor for any anti-degradation agent. Moreover, a volatile amine may have an undesirable effect on adjacent articles. For example, amines often discolor paint and lacquer films. Moreover, for satisfactory preservation during long periods of storage, low volatility is essential. Another problem associated with the use of amines in rubber compounding is the activation of cure by lowering the critical temperature of vulcanization and increasing the rate of vulcanization. The practical problems of factory processing confines use by amines to those which do not seriously affect the cure. If a stock prevulcanizes or scorches during processing, it must be relegated to scrap. The annual loss from premature vulcanization is very high. For these reasons the discovery of low volatile amines having little affect on cure in spite of the presence of free primary amino groups is significant.

The N-alicyclic, alkyl and alkenyl o-phenylenediamines containing at least 6 carbon atoms in the alicyclic, alkyl or alkenyl group fulfill the objects of this invention. The new class of compounds may be represented by the general formula

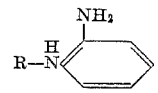

where R represents an alicyclic, alkyl or alkenyl group containing at least 6 carbon atoms. Radicals containing 6 to 12 carbon atoms inclusive comprise the most valuable group. By alkenyl is meant an open chain unsaturated hydrocarbon radical containing one double bond.

A convenient method of manufacture is to condense o-nitrochlorobenzene, a readily available raw material, with a primary amine and then reduce the intermediate nitroaniline to the mixed primary-secondary amine. The invention will be illustrated by describing the preparation and properties of N-cyclohexyl-o-phenylenediamine in detail but it will be appreciated that other amines having similar properties may be obtained in the same manner and are similarly useful. Examples are N-hexyl-o-phenylenediamine, N-heptyl-o-phenylenediamine, N-octyl-o-phenylenediamine, N - nonyl - o-phenylenediamine, N-decyl - o - phenylenediamine, N - dodecyl - o-phenylenediamine, N - methylcyclohexyl - o - phenylenediamine, N-octenyl - o - phenylenediamine, N-hexenyl-o-phenylenediamine and N-decenyl-o-phenylenediamine.

Cyclohexylamine was condensed with o-nitrochlorobenzene employing a molar ratio of 3 moles of cyclohexylamine to 1 mole of o-nitrochlorobenzene. A glass or glass-lined reactor was charged with 157.6 parts by weight of o-nitrochlorobenzene and 296.9 parts by weight of cyclohexylamine. Over a period of about 25 minutes the reaction mixture was heated to refluxing temperature (143° C.). The temperature rose gradually to 163° C. over a period of about an hour. Heating was continued for 15 minutes longer, then 100 parts by weight of water and 160 parts by weight of 25% sodium hydroxide added. The reaction mixture was stirred with the aqueous caustic and then the alkaline layer separated and distilled azeotropically with excess water to recover cyclohexylamine. Substantially 1.92 molecular proportions were recovered, about 1.08 molecular proportions being consumed. The product which crystallized on cooling was washed with water and dried to yield 195 parts by weight of orange crystals, M.P. 107–108° C. This represents a yield of about 89% on o-nitrochlorobenzene or 82% on cyclohexylamine.

The amine is obtained by reduction over palladium or platinum in a Parr hydrogenator using charges of about 50 parts by weight of N-cyclohexyl-o-nitroaniline and 0.2 part by weight of palladium on calcium carbonate and 80 parts by weight of methanol. Hydrogen was introduced and the contents of the reactor shaken at about 70°

C. at pressure of about 60 pounds per square inch gauge, until the theoretical pressure drop was obtained. The product was isolated as a low melting solid, M.P. 55–56° C., B.P. 171–180° C./8–9 mm. The reduction also succeded with 2–3% by weight of a commercial nickel catalyst at about 120° C. and hydrogen pressure about 150 pounds per square inch gauge. Yields were about 86% on N-cyclohexyl-o-nitroaniline.

Skin irritation tests were carried out employing an arbitrary score of 1 to 8 for scoring. A score of 1 represents only a slight irritating effect such as with ordinary mild soap whereas an 8 represents a severe irritant such as concentrated acids and alkalies. On this scale N-cyclohexyl-o-phenylenediamine scored 2.6.

The powerful anti-exposure cracking properties were illustrated by compounding stocks comprising

| Stock | A | B | C | D |
|---|---|---|---|---|
| | Parts by weight | | | |
| Smoked sheets rubber | 100 | 100 | | |
| Butadiene-styrene Copolymer (GR-S X-761) | | | 100 | 100 |
| Furnace carbon black | 50 | 50 | 50 | 50 |
| Zinc oxide | 5 | 5 | 4 | 4 |
| Stearic acid | 3 | 3 | 2 | 2 |
| Saturated hydrocarbon softener | 3 | 3 | 10 | 10 |
| Sulfur | 2.5 | 2.5 | 1.75 | 1.75 |
| N-Cyclohexyl 2-benzothiazolesulfenamide | 0.5 | 0.5 | 1.2 | 1.2 |
| N-Cyclohexyl-o-phenylenediamine | | 1.5 | | 1.5 |

The natural rubber stocks were cured by heating in the usual manner in a press for 45 minutes at 144° C. In the case of the GR-S stocks, the cure was 60 minutes at the same temperature.

For reasons already explained, evaluation under static conditions is not indicative of the service life of rubber articles which must withstand flexing so the vulcanized compositions were evaluated under dynamic conditions in an atmosphere containing a definite concentration of ozone. Samples of the stocks were cured in the form of a belt ½" wide, ¼" thick and 5 5/16" diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed are described in a paper of Creed et al. entitled "An Apparatus for the Evaluation of Ozone Protective Agents for Elastomers Under Dynamic Conditions" given at the Cincinnati, Ohio, Meeting of the Rubber Division of the American Chemical Society May 1, 1952.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table 1

| Stock | Surface cracking after flexing in ozone for — | | | |
|---|---|---|---|---|
| | 36 hours | 48 hours | 60 hours | 72 hours |
| A | extremely severe. | | | |
| B | none | very slight | slight extremely severe. | slight. |
| C | moderate | severe | | |
| D | none | none | none | none. |

The GR-S rubber stocks were aged in an air oven at 100° C. for 48 hours and the modulus and ultimate elongation of the aged vulcanizates compared to those of the stocks before aging. It will be noted that without a preservative the modulus increased more than 50% of the original and the ultimate elongation was only 63% of the initial, representing a serious loss of rubbery properties. Stocks containing commercial antioxidants heretofore known retain only about 70% of the elongation after similar aging conditions.

Table II

| Stock | Percent original 300% modulus | Percent original ultimate elongation |
|---|---|---|
| C | 154 | 63 |
| D | 120 | 85 |

While the new compounds are not effective anti-agers for natural rubber, the loss in tensile strength on aging being about the same as for the unprotected stocks, the protection afforded against exposure cracking is outstanding. Moreover, the new compounds increase the time within which a natural rubber stock relaxes under a constant load. In this test, known as the continuous creep test, 40 hours were required for Stock B to double in length whereas the time required for Stock A to double in length was 28 hours. A description of the apparatus and procedure may be found in Industrial and Engineering Chemistry, vol. 40, p. 2180, November 1948, by M. C. Throdahl entitled "Aging of Elastomers. Comparison of Creep With Some Conventional Aging Methods." Another manifestation of beneficial action of the new compounds on natural rubber is increased flex life of the vulcanizates.

Substitution in the ortho position is critical to avoid activation of cure. While the new compounds are not free from some activating influence, rubber stocks containing them can be handled with ordinary precautions. Prevulcanization or scorch was evaluated by means of a Mooney plastometer. The scorch characteristics of unvulcanized Stock D was compared to those of a similar stock in which the N-cyclohexyl-o-phenylenediamine was replaced by 1.5 parts by weight of 6-ethoxy-1,2-dihydro-2,2,4-trimethylquinoline, a commercial anti-exposure cracking agent and antioxidant. The Mooney scorch time of Stock D was 86% of that of the stock containing the commercial antioxidant whereas a stock containing 1.5 parts by weight of N-cyclohexyl-p-phenylenediamine scorched in 45% of the time. Presumably the close proximity of the amino groups accounts for the wide difference in the activating effect of the amines.

It is intended to cover all changes and modifications of the examples of the invention herein chosen for purposes of disclosure which do not constitute departures from the spirit and scope of the invention.

What is claimed is:

1. A sulfur vulcanizable rubber composition containing a small amount sufficient to inhibit exposure cracking of a compound of the structure

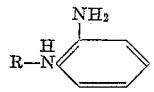

where R represents a radical containing 6 to 12 carbon atoms selected from the group consisting of alkyl, alkenyl, cyclohexyl and alkylcyclohexyl groups.

2. Butadiene-styrene copolymer rubber containing a small amount sufficient to inhibit exposure cracking of a compound of the structure

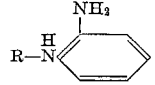

where R represents a radical containing 6 to 12 carbon atoms selected from the group consisting of alkyl, alkenyl, cyclohexyl and alkylcyclohexyl groups.

3. Butadiene-styrene copolymer rubber containing a small amount sufficient to inhibit exposure cracking of N-cyclohexyl-o-phenylenediamine.

4. Vulcanized butadiene-styrene copolymer rubber having incorporated therein a small amount sufficient to inhibit exposure cracking of N-cyclohexyl-o-phenylenediamine.

5. Vulcanized natural rubber having incorporated therein a small amount sufficient to inhibit exposure cracking of N-cyclohexyl-o-phenylenediamine.

6. Butadiene-styrene copolymer rubber containing a small amount sufficient to inhibit exposure cracking of a compound of the structure

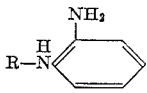

where R represents an alkyl radical containing 6 to 12 carbon atoms.

7. Sulfur vulcanized butadiene-styrene copolymer rubber containing a small amount, sufficient to inhibit cracking under stress in the presence of ozone, of N-cyclohexyl-o-phenylenediamine.

References Cited in the file of this patent
UNITED STATES PATENTS

| | | |
|---|---|---|
| 1,814,420 | Tochtermann et al. | July 14, 1931 |
| 1,836,295 | Thiess et al. | Dec. 15, 1931 |
| 2,067,686 | Semon | Jan. 12, 1937 |
| 2,381,015 | Bramer et al. | Aug. 17, 1945 |
| 2,615,919 | Biswell | Oct. 28, 1952 |
| 2,645,674 | Kinney | July 14, 1953 |
| 2,651,622 | Hill et al. | Sept. 8, 1953 |

FOREIGN PATENTS

| | | |
|---|---|---|
| 717,680 | Great Britain | Nov. 3, 1954 |

OTHER REFERENCES

Shaw et al.: "Antiozidants for GR–S Rubber," Rubber World (August 1954), pages 636–642.